April 18, 1933.  V. G. APPLE  1,904,813
ELECTRIC CONTROLLER
Filed June 13, 1928
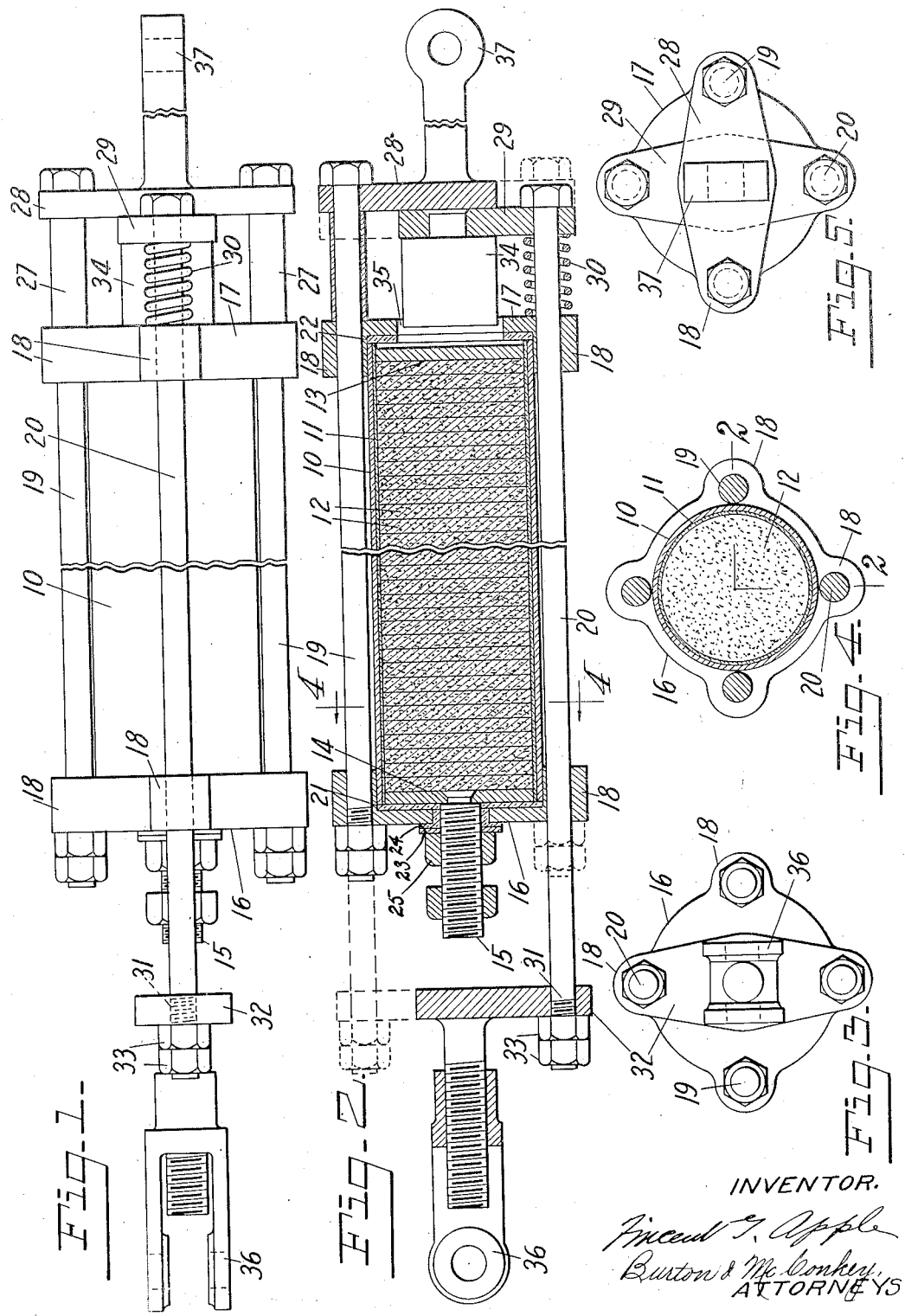
INVENTOR.
Vincent G. Apple
Burton & McConkey,
ATTORNEYS Patented Apr. 18, 1933

1,904,813

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

ELECTRIC CONTROLLER

Application filed June 13, 1928. Serial No. 285,091.

My invention relates to an improved electric controller and particularly to one adapted to transmit energy mechanically and electrically and wherein the electrical energy transmitted is a function of the mechanical energy transmitted.

A particular and important use for my improved controller is in applying the brakes of a motor vehicle wherein it is desired to employ electrical energy to supplement the mechanical energy and in proportion to the mechanical energy transmitted in applying the brakes, though obviously my improved controller is useful in various other associations.

An object of my invention is to provide a controller of the graphite disc variety wherein the electric circuit is through a plurality of graphite discs arranged in a column and through which energy is also mechanically transmitted. The amount of current passing through the controller depends on the contact resistance between the discs and varies with the pressure applied to compact the column of discs and in the construction illustrated it varies directly with the mechanical energy transmitted in order that it may be maintained in a predetermined ratio.

The controller here shown and claimed is illustrated in conjunction with automobile brake applying mechanism in my co-pending application signed this day and being Serial No. 285,089, filed June 13, 1928.

The above objects and others, together with various advantages and meritorious features of my invention will more fully appear from the following description, appended claims and accompanying drawing, wherein:

Fig. 1 is a plan view of the controller.

Fig. 2 is a right angle section taken at 2—2 of Fig. 4.

Figs. 3 and 5 are front and rear end views respectively.

Fig. 4 is a cross section taken at 4—4 of Fig. 2.

While the embodiment of my invention herein shown and described is particularly adapted to operate in conjunction with an electro-magnet for applying brakes, being shown adapted to that purpose in my co-pending application, it may be employed for a variety of purposes to good advantage.

Referring to the drawing, a length of tubing 10 is lined with insulation 11 and filled with graphite discs 12, a plain metal end disc 13 and another metal end disc 14 having a binding post 15 secured thereto by riveting as shown. Metal caps 16 and 17, having ears 18 for bolts 19 and 20, telescope and enclose the ends of the tube, and insulation washers 21 and 22 both of a diameter equal to the outside of tube 10 covers its ends before caps 16 and 17 are put on.

Binding post 15 is insulated from the metal end cap 16 by insulation washers 21, 23 and 24, while nut 25 bearing against washers 23 and 24 secures the binding post to the cap 16.

Bolts 19 extending thru ears 18 hold caps 16 and 17 rigidly against the ends of tube 10, and the bolts have sufficient additional length to extend at one end through small spacing tubes 27 and through the holes in member 28 to hold it in fixed relation to the tube 10 yet spaced apart therefrom.

Bolts 20 somewhat longer than bolts 19 extend through holes in plate 29, through springs 30, slidably thru ears 18, then into tapped holes 31 in member 32 to which they are secured by lock nuts 33.

Plate 29 has metal contact plug 34 riveted thereto. This plug extends through opening 35 in end cap 17 to make contact with metal end disc 13 when springs 30 are suitably depressed.

From the foregoing description it is apparent that if the controller is attached at ends 36 and 37 and effort exerted to move these ends apart, so placing the mechanism in tension, the circuit will be first closed, then the resistance therein will be lowered, as the tension is increased, the circuit being from binding post 15 through the graphite discs and across their combined contact resistance to plug 34 and thence to a ground.

While the structure shown is adapted to a source of current supply having one terminal grounded, insulating the plug 34 from plate 29 and attaching a binding post to the plug would adapt it to a source of supply having both terminals insulated.

Other variations in structural detail may be made to adapt the device to variety of uses, and all such changes permissible within the spirit of the invention, as set forth in the description and drawing, I aim to embrace in the following claims.

I claim:

1. A controller adapted to serve as a mechanical tension transmitting assembly including, in combination, a casing, a pile of carbon discs housed therein, a tension link rigidly secured to said casing and extending in one direction, and a second tension link slidably associated with said casing and extending in the opposite direction, said slidable link including means rigid therewith operable to compress the carbon discs when said links are placed under tension.

2. Mechanism as described in claim 1 wherein yieldable means are associated with said tension links to normally retain the same in extended relation.

3. A connection for the transmission of electrical and mechanical energy comprising, in combination, a casing, a pile of electrically conductive discs housed therein, relatively slidable overlapping mechanical tension transmitting members supporting said casing, the inner end of each overlapping member including an electrical contact adapted to bear against the disc of said pile furthest removed from its outer end whereby the said discs are compressed to decrease the resistance therein when the said members are placed under tension.

4. A controller adapted to be included in an electric circuit to vary the resistance thereof, said controller comprising, in combination, a relatively long insulation lined container, a plurality of discs of relatively good conductive material but of high contact resistance inclosed therein and forming a part of the electric circuit, a binding post associated with the disc at one end of said container, a contact plug adapted to be brought into contact with the disc at the opposite end thereof to complete the circuit, yieldable means normally retaining said plug out of contact, supporting means for said binding post rigidly associated with said container and including a tension link projecting beyond the end thereof opposite said binding post and a cooperating slidable tension link secured to said plug and extending beyond the end of said container opposite thereto, whereby mechanical tensioning of said links brings said contact plug into contact with said disc and places the same under compression in proportion to the tension created to decrease the resistance in said circuit.

In testimony whereof, I, VINCENT G. APPLE, sign this specification.

VINCENT G. APPLE.